United States Patent [19]

Klocke

[11] Patent Number: 4,621,660

[45] Date of Patent: Nov. 11, 1986

[54] BISTABLE MAGNETIC VALVE

[75] Inventor: Harald Klocke, Malente, Fed. Rep. of Germany

[73] Assignee: H. Kuhne GmbH KG, Fed. Rep. of Germany

[21] Appl. No.: 786,812

[22] Filed: Oct. 11, 1985

[30] Foreign Application Priority Data

Oct. 12, 1984 [DE] Fed. Rep. of Germany ....... 3437487

[51] Int. Cl.$^4$ .......................................... F16K 11/052
[52] U.S. Cl. ......................... 137/625.44; 137/625.65; 251/65; 251/129.09
[58] Field of Search ...................... 137/625.44, 625.64, 137/625.65, 625.45, 625.2, 625; 251/65, 129.1, 129.16, 129.15, 129.21, 129.01, 129.02, 129.04, 129.05, 129.06, 129.07, 129.08, 129.09, 129.17, 129.2, 129.22, 298, 301, 302, 303

[56] References Cited

U.S. PATENT DOCUMENTS

| | | | |
|---|---|---|---|
| 3,215,162 | 11/1965 | Carver | 137/625.44 |
| 3,457,955 | 7/1969 | Kleiner et al. | 137/625.44 |
| 3,484,074 | 12/1969 | Lynes et al. | 251/65 |
| 3,532,121 | 10/1970 | Sturman et al. | 251/65 |
| 4,253,493 | 3/1981 | English | 137/625.5 |

Primary Examiner—Martin P. Schwadron
Assistant Examiner—John S. Starsiak, Jr.
Attorney, Agent, or Firm—Kinzer, Plyer, Dorn & McEachran

[57] ABSTRACT

In a valve of this nature, the armature is held in its momentary switching position by the force of permanent magnets. To change the switching position of the armature, electrical pulses are fed to the electromagnetic system of the valve to cause a variation of the magnetic flux in the area of the yoke and thus a reversal of the position of the armature. The whole magnetic system of the valve is incorporated in one housing. To obtain a magnetic valve for control of fluids which has its structural volume reduced considerably, at least the said housing of the valve is provided with fluid ducting passages, the central space of the magnetic system receiving the pivotably formed armature being divided into two mutually and hermetically separated chambers through which is ducted the fluid which is to be controlled, the two extremities of the armature acting as closing members which close or open corresponding inflow or outflow passages of the said chambers as a function of armature position.

8 Claims, 6 Drawing Figures

{ 4,621,660 }

BISTABLE MAGNETIC VALVE

BACKGROUND OF THE INVENTION

1. Field of the Invention

The invention relates to a bistable magnetic valve in which a yoke situated within a housing holds at least one electric coil to be subjected to alternate pulses which surrounds a central space within which an armature is pivotally journalled at its centre of gravity, wherein two terminal portions of the armature are constructed and arranged for the opening and closing of fluid ducting paths, and a permanent magnet is arranged to hold the armature in a momentary operating position by magnetic force.

2. Description of the Prior Art

A bistable magnetic valve of the aforesaid kind is described in German Patent Specification Nos. 20 32 361 and 29 00 473, as well as in the German Patent Publication No. 20 22 830. These previously known magnetic valves have a comparatively large structural volume since the section comprising the ducting paths for the fluid which is to be controlled, inclusive of their control elements, is accommodated in a separate housing section which is flange-coupled to the housing section containing the bistable magnetic system. A large structural volume of the magnetic valve in question prevents the application of a valve of this nature in confined space conditions or leads to complex installation since the valve has to be placed at an unfavourable point and longer external fluid pipes are required. Another disadvantage of the housing section carrying the fluid pipes or ducts consists in that its construction as a multiway valve is comparatively complex since transmission elements are needed which transmit the displacements of the armature into the housing section for the fluid ducts. It was found moreover that the sealing force applied by the permanent magnet resulted in defective hermeticity under high fluid pressures.

OBJECTS AND SUMMARY OF THE INVENTION

An object of the invention consists in devising a magnetic valve of the kind defined in the foregoing, which is of reduced structural volume and is constructed as a compact multiway valve in an uncomplicated manner, as well as possessing comparatively greater holding forces exerted by permanent magnets.

The solution of this problem is based on the magnetic valve specified and is characterised in that the armature pivot bearing is formed by a diaphragm centrally enframing the armature in the plane of the centre of gravity and clamped in fluid-tight manner at the periphery, that the diaphragm divides the central space into two substantially closed compartments with which the ducting paths, preferably integrated into the housing, are in communication, and into each of which the armature engaged in the diaphragm projects with one of its branches, and that the extremities of the armature branches have valve members situated on them, whereby at least some openings of the ducting paths present in the compartments are closed or opened depending on armature position.

A preferred development of the magnetic valve according to the invention consists in that permanent magnets are situated in the regions of the armature extremities, the permanent magnets having an axial spacing from the two armature extremities and overbridge the yoke elements in this area.

Thanks to this solution, the magnetic valve in question has its structural volume considerably reduced, since a separate housing portion for the fluid ducting paths is eliminated. The housing section required in any case for the magnetic system is appropriately also utilised to accommodate the fluid ducting paths, the central space containing the pivoting armature being utilised as a control space for the fluid which is to be controlled and the armature itself actually serving the purpose of a closing element or valve element. A particularly compact form of constructions of the magnetic valve is the result if, for example, the permanent magnets are integrated in the form of annular magnets in the outer coil member and are enclosed by the yoke thereat, since the fluid ducting compartments may then be made in a smaller size.

Another advantage deriving from this solution consists in that multiway valves may be produced in a simple manner, being, for example, 2/2 way valves, 3/2 way valves or as 5/2 way valves with an otherwise identical structure. Furthermore, the diaphragm results in a practically frictionless mounting of the pivoting armature, so that the armature is more sensitive to the magnetic flux in the yoke. This comparatively high response sensitivity cannot moreover be obtained by means of other armature mountings which were previously known for example as illustrated and described in GB Pat. No. 1,117,794 or in the German Patent Publication No. 25 11 152. In any case, the retention and mounting of the armature by means of a torsion bar are not advantageous in this respect. The same applies if the armature and complementary parts of the valve system are retained by means of a diaphragm, since a constructional principle of this kind results in a sluggish operation of the valve because of the great mass of the parts carried by the diaphragm.

BRIEF DESCRIPTION OF THE DRAWINGS

The invention will now be described, by way of example, with reference to the accompanying partly diagrammatic drawings, in which.

DETAILED DESCRIPTION OF PREFERRED EMBODIMENTS

Figure 1:
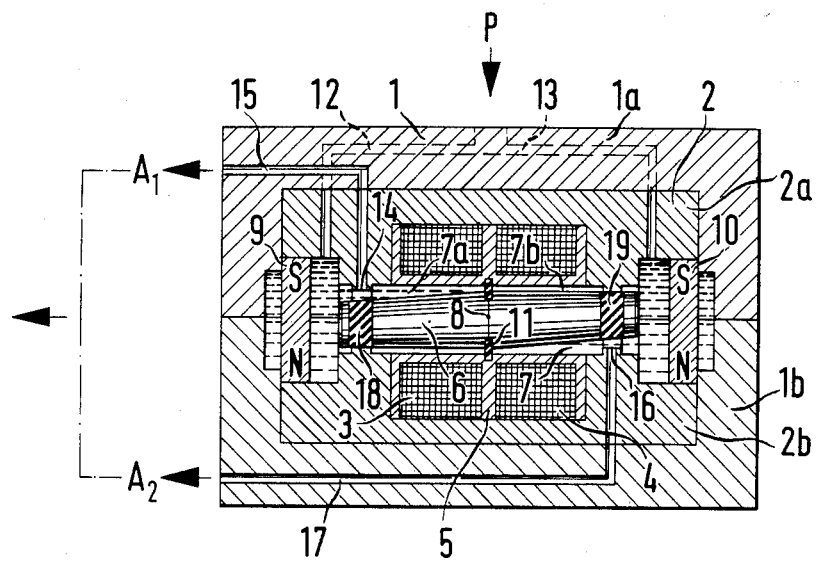
FIG. 1 is a first embodiment of a valve according to the invention in axial cross-section.

According to FIG. 1, the magnetic valve proposed comprises a housing 1 formed by the two parts 1a and 1b, a yoke 2 formed by two parts 2a,2b, two coils 3 and 4, the one coil being wound in the opposite direction to that of the other coil, a coil carrier 5 securing the coils and situated in the yoke 2, a pivot armature 6 which is pivotally mounted about its centre of gravity 8 in the central space 7 formed in conventional manner by the annular coils 3 and 4 and by the yoke 2, and two permanent magnets 9 and 10 which confront the extremities of the armature 6 with axial spacing and bridge the yoke sections 2a,2b. The central space 7 is enlarged in the yoke regions adjacent to the two armature extremities, to secure the permanent magnets 9,10 in the yoke 2. An annular diaphragm 11 is provided in the central space 7, by means of which the pivoting armature 6 is pivotally mounted about its centre of gravity 8 and which divides the central space into two compartments 7a and 7b hermetically separated from each other. An exemplifying structure and installation of the diaphragm 11 is described below with reference to FIGS. 5 and 6.

Ducting paths which in accordance with FIG. 1 extend in the housing 1 as well as in the yoke 2, are provided for the fluid which is to be controlled. The magnetic valve illustrated is a 2/2 way valve in which the fluid signal arriving at the connector P reaches the chambers 7a and 7b via the ducting paths 12 and 13 shown by pecked lines. Since the outflow openings 14 and 16 of the chambers 7a and 7b are open, the fluid may be ducted onwards as a working signal A1 via the outflow passage 15 and as a working signal A2 via the other outflow passage 17. The openings 14 and 16 are opened and closed by the pivoting armature 6 itself, the latter being provided with sealing layers 18,19 for this purpose.

The common connector P illustrated may evidently also be divided into two separate connectors P, so that two fluids may be controlled by means of this magnetic valve, separately from each other. The corresponding working signals A1 and A2 are then available in the outflow passages 15 and 17. Two 2/2 way valves are thus provided in this manner.

Furthermore, the two outflow passages 15 and 17 may be combined in the case of a common connector P, as shown dash-dotted in FIG. 1. A cross-sectional summation of the outflow passages, together with a correspondingly powerful working signal, is thereby secured.

The function of the magnetic valve described is the following. Let the position of the armature 6 shown in FIG. 1 be the initial position of the valve. The coils 3 and 4 are energised to reposition the armature and thereby to close the openings 14 and 16. Their contradirectional winding, in combination with the opposed poles of the permanent magnets 9 and 10 according to FIG. 1, on the one hand causes an attenuation of the magnetic forces of the one permanent magnet, and on the other hand an intensification of the magnetic forces of the other permanent magnet, so that the armature is pivoted and closes the said openings. The coils are then de-energised and the armature 6 is held in the new position by the force of the permanent magnets. No signals A1 and A2 are then available. To open the openings 14 and 16, the coils 3 and 4 re-energised but with reverse polarity, so that the armature may be pivoted accordingly in an opposite sense.

Figure 2:
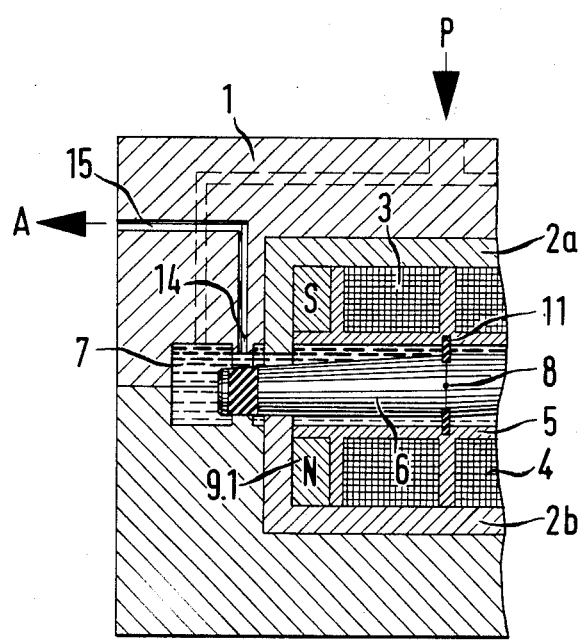
FIG. 2 is a fragmentary view of a modified form of the valve of FIG. 1, in axial cross-section.

FIG. 2 shows a modified form of embodiment of the magnetic valve according to FIG. 1. The modification consists in that all the fluid ducting passages are provided within the housing 1 and that each armature extremity has allocated to it an annular magnet 9.1, the annular magnets being situated on external flanges of the coil carrier 5 and are surrounded by the yoke sections 2a,2b. the yoke 2 and the housing 1 may be constructed shorter than in the example according to FIG. 1, thanks to this feature.

Figure 4:
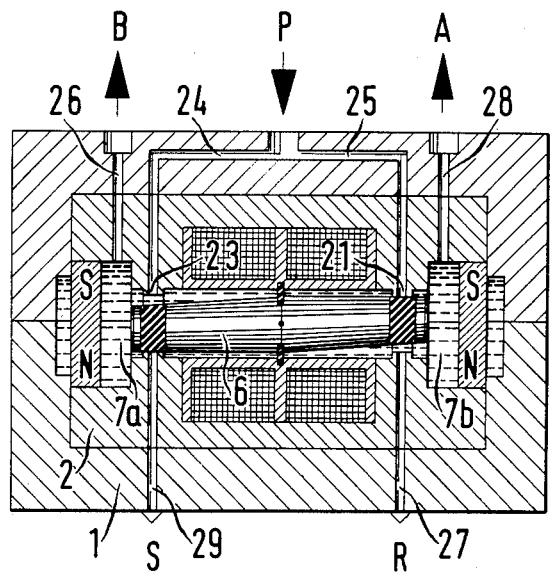
FIGS. 3 and 4 show other embodiments in axial cross-section, which are modified regarding the fluid ducting paths.
Figure 3:
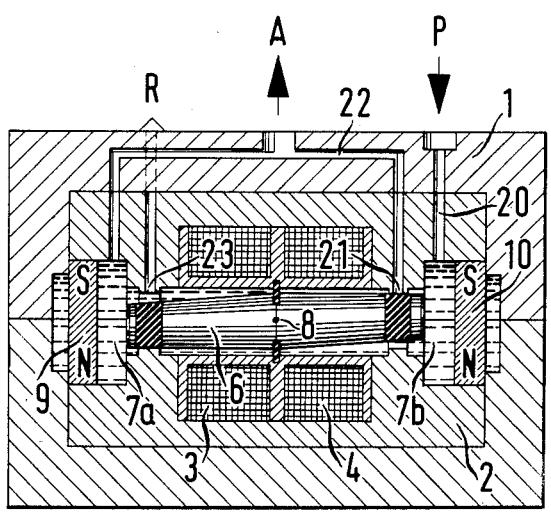

FIGS. 3 and 4 show other embodiments in the structure of a 3/3 way valve or of a 5/2 way valve, respectively. The construction of these valves differs merely by the extension of the fluid ducting passages from that of the magnetic valves according to FIGS. 1 and 2. The operation of these valves is also the same. According to FIG. 3, a feed passage 20 leads from the connector P to the chamber 7b which for its part provides a working signal A via the opening 21 and the outflow passage 22. The opening 21 is closed however in the depicted position of the armature 6, so that the connector A is in communication with the venting connector R, since the opening 23 of the other chamber 7a is opened.

FIG. 4 shows the 5/2 way valve embodiment. Fluid is fed from the common connector P to the chambers 7a and 7b via the feed passages 24,25. The opening 23 is open in the case illustrated, whereas the other opening 21 is closed, so that a working signal B is available only via the outflow passage 26 of the chamber 7a. In this case, the chamber 7b is connected to the connector R via the venting passage 27. After switching the armature 6 over, the working signal A is available via the outflow passage 28, and the venting passage 29 leading to the venting connector S is opened.

Figure 5:
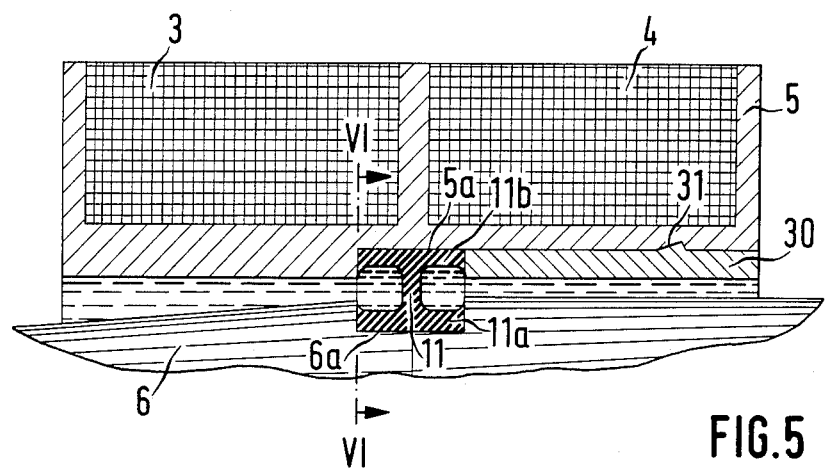
FIG. 5 is a fragmentary view to enlarged scale of detail of the diaphragm installation.
Figure 6:
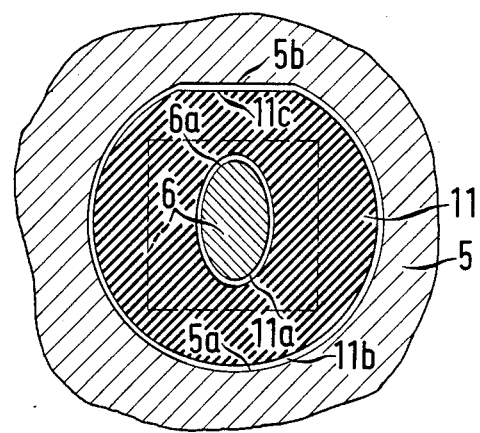
FIG. 6 is a fragmentary cross-section along the line VI—VI of FIG. 5.

FIGS. 5 and 6 show details regarding the form and installation of the diaphragm 11 which serves the purpose of mounting the armature 6.

The annular diaphragm 11 of elastic material, e.g. rubber, has the cross-sectional shape of a double letter T (FIG. 5), so that flanges 11a,11b are present at its edges. The armature-side flange 11a is seated in a groove 6a of the armature 6, whereas the coil-side flange 11b is seated in a step 5a of the coil carrier 5. A securing sleeve 30 pushed against the step prevents an axial shift of the diaphragm 11, the sleeve itself being axially located by means of a catch means 31 of known kind.

In a modified form, the flanges 11a,11b may also be replaced by enlargements. The application of a diaphragm for mounting the armature 6 has the advantage that a practically frictionless mounting of the armature is provided, which leads to a reduced electrical driving power for switching over the armature.

To prevent a pivotal shift of the armature 6 about its longitudinal axis and thereby to assure reliable closure of the said outflow openings 14,16 etc. of the chambers 7a and 7b, the groove 6a of the armature 6 and the diaphragm flange 11a seated in this groove are produced in elliptical form for example as seen in the radial armature cross-section, the major axis of the ellipse lying in the pivoting plane of the armature for example (FIG. 6). A rectangular, square or analogous form may also be provided instead of the elliptical shape.

If the seating grip established by the sleeve 30 on the other flange 11b of the diaphragm 11 does not assure any diaphragm contact secured against rotation in the coil carrier 5, the commonly circular flange 11b may for example comprise a straight part 11c which bears against a mating surface 5b of the step 5a.

In further embodiment of the magnetic valves described in the foregoing, the material of the armature 6 and/or the yoke 2, consists of amorphous metal. This material may be remagnetised extremely rapidly, so that this allows for securing particularly high switch-over frequencies of the armature and that a correspondingly equipped magnetic valve thus operates very rapidly. Amorphous metals are known and, for example, consist of alloys containing 70 to 80 atom-% of one or more magnetic materials such as iron, cobalt and nickel which may be provided with a small proportion of chromium or molybdenum for fine tuning purposes, the residue being metalloids such as, for example, boron, silicon, carbon or phosphorous. Alloys of this nature are shaped into amorphous strips of a thickness of 50 micrometers as a rule, from which the corresponding components—being the armature and/or yoke in this case—are then produced.

Although the application of two coils which are subjected to pulses alternately and in opposite direction in each case has been described in the preceding examples, it is also possible however to utilise one electrical coil only, which is subjected alternately to pulses of opposed polarity in each case.

Whilst the invention and many of its attendant advantages will be understood from the foregoing description, it will be apparent that various changes may be made in the form, construction and arrangement of the parts without departing from the spirit and scope of the invention or sacrificing all of its material advantages, the forms hereinbefore described merely being preferred embodiments thereof.

I claim:

1. Bistable magnetic valve wherein a yoke situated in a housing secures at least one electric coil subjected to alternate pulses, and which surrounds a central space which has mounted in it an armature pivotably mounted for pivotal movement about its centre of gravity, said housing having fluid passages, the two end portions of the armature constituting valve elements for the opening and closing of said passages, permanent magnets located within the housing and being arranged to maintain a predetermined position of the armature by magnetic force, in which the armature pivot is provided by a diaphragm centrally surrounding the armature and peripherally clamped thereto in fluid-tight manner, the diaphragm dividing the central space into two substantially closed chambers with which said passages are in communication and into which the armature valve ends respectively extend, whereby the passages into the chambers are closed or opened depending on armature pivotal position.

2. A valve according to claim 1, in which the permanent magnets are situated in the region of the armature extremities.

3. A valve according to claim 1, in which the yoke includes two sections, in which said permanent magnets are displaced from the ends of the armature and bridge the yoke sections.

4. A valve according to claim 1, in which the coil is supported by a carrier, and in which the diaphragm is of annular structure and of double-T-shaped flange cross-section and is seated with its flange portions in groove-like depressions of the armature and of the carrier for the coils.

5. A valve according to claim 4, in which the the coil carrier is formed with a recess wherein is seated a sleeve as an axial lock for securing the diaphragm in position.

6. A valve according to claim 4, in which the peripheral shape of the groove-like depression of the armature and the portion of the diaphragm seated in this depression is formed in non-circular shape.

7. A valve according to claim 1, in which the material of the armature is an amorphous metal.

8. A valve according to claim 1, in which the material of the yoke is an amorphous metal.

* * * * *